(12) United States Patent
Yi et al.

(10) Patent No.: US 10,680,967 B2
(45) Date of Patent: Jun. 9, 2020

(54) METHOD FOR HANDLING STATE VARIABLES OF A PDCP ENTITY IN WIRELESS COMMUNICATION SYSTEM AND A DEVICE THEREFOR

(71) Applicant: LG Electronics Inc., Seoul (KR)

(72) Inventors: Seungjune Yi, Seoul (KR); Geumsan Jo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/453,187

(22) Filed: Jun. 26, 2019

(65) Prior Publication Data
US 2019/0319893 A1    Oct. 17, 2019

Related U.S. Application Data

(63) Continuation of application No. 16/057,104, filed on Aug. 7, 2018.
(60) Provisional application No. 62/541,791, filed on Aug. 7, 2017.

(51) Int. Cl.
H04L 12/863      (2013.01)
H04L 12/801      (2013.01)
H04W 80/02       (2009.01)

(52) U.S. Cl.
CPC .......... H04L 47/624 (2013.01); H04L 47/34 (2013.01); H04W 80/02 (2013.01)

(58) Field of Classification Search
CPC ....... H04L 47/624; H04L 47/34; H04W 80/02
See application file for complete search history.

(56) References Cited

U.S. PATENT DOCUMENTS

2009/0016301 A1*  1/2009  Sammour ............... H04L 49/90
                                                 370/331
2016/0044536 A1   2/2016  Zeng et al.
2016/0315868 A1* 10/2016  Zhang .................. H04L 47/624

OTHER PUBLICATIONS

3GPP TS 38.323 v0.2.0 (Aug. 2017), Packet Data Convergence Protocol (PDCP) specification (Release 15), last modified Jul. 19, 2017, sections 5.2.2 and 7.1 (Year: 2017).*
United States Office Action in U.S. Appl. No. 16/057,104, dated Oct. 4, 2019, 11 pages.

* cited by examiner

Primary Examiner — Curtis A Alia
(74) Attorney, Agent, or Firm — Fish & Richardson P.C.

(57) ABSTRACT

The present invention relates to a wireless communication system. More specifically, the present invention relates to a method and a device for handling state variables of a PDCP entity in wireless communication system, the method comprising: delivering an PDCP SDU associated with a first COUNT to upper layer and starting, by the PDCP entity, a reordering timer, when an out-of-order PDCP PDU with the first COUNT value is received from lower layer; updating a value of a first state variable to the first COUNT value +1, when the reordering timer starts; and when the reordering timer expires, updating, by the PDCP entity, a value of a second state variable based on a second COUNT value of a first PDCP SDU which has not been delivered to upper layers, among PDCP SDUs with COUNT values which are equal to or larger than the first state variable.

10 Claims, 15 Drawing Sheets (a) Control-Plane Protocol Stack (b) User-Plane Protocol Stack (a) Control-Plane Protocol Stack (b) User-Plane Protocol Stack

METHOD FOR HANDLING STATE VARIABLES OF A PDCP ENTITY IN WIRELESS COMMUNICATION SYSTEM AND A DEVICE THEREFOR

This application is a continuation of U.S. application Ser. No. 16/057,104, filed on Aug. 7, 2018, which claims the benefit of the U.S. Provisional Application No. 62/541,791 filed on Aug. 7, 2017. The disclosures of the prior applications are incorporated by reference in their entirety.

BACKGROUND OF THE INVENTION

Field of the Invention

The present invention relates to a wireless communication system and, more particularly, to a method for handling state variables of a PDCP entity in wireless communication system and a device therefor.

Discussion of the Related Art

As an example of a mobile communication system to which the present invention is applicable, a 3rd Generation Partnership Project Long Term Evolution (hereinafter, referred to as LTE) communication system is described in brief FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. Details of the technical specifications of UMTS and E-UMTS are provided in Release 7 and Release 8 of "3rd Generation Partnership Project; Technical Specification Group Radio Access Network", for example.

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

As more and more communication devices demand larger communication capacity, there is a need for improved mobile broadband communication compared to existing RAT. Also, massive machine type communication (MTC), which provides various services by connecting many devices and objects, is one of the major issues to be considered in the next generation communication (NR, New Radio). In addition, a communication system design considering a service/UE sensitive to reliability and latency is being discussed. The introduction of next-generation RAT, which takes into account such Enhanced Mobile BroadBand (eMBB) transmission, and ultra-reliable and low latency communication (URLLC) transmission, is being discussed.

SUMMARY OF THE INVENTION

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF THE INVENTION

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described in the context of a long term evolution (LTE) system and a LTE-advanced (LTE-A) system in the present specification, they are purely exemplary. Therefore, the embodiments of the present invention are applicable to any other communication system corresponding to the above definition. An exemplary system in which the invention disclosed herein may be implemented is a system compliant with the 3GPP specification TS 36.321 Version 12.6.0. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
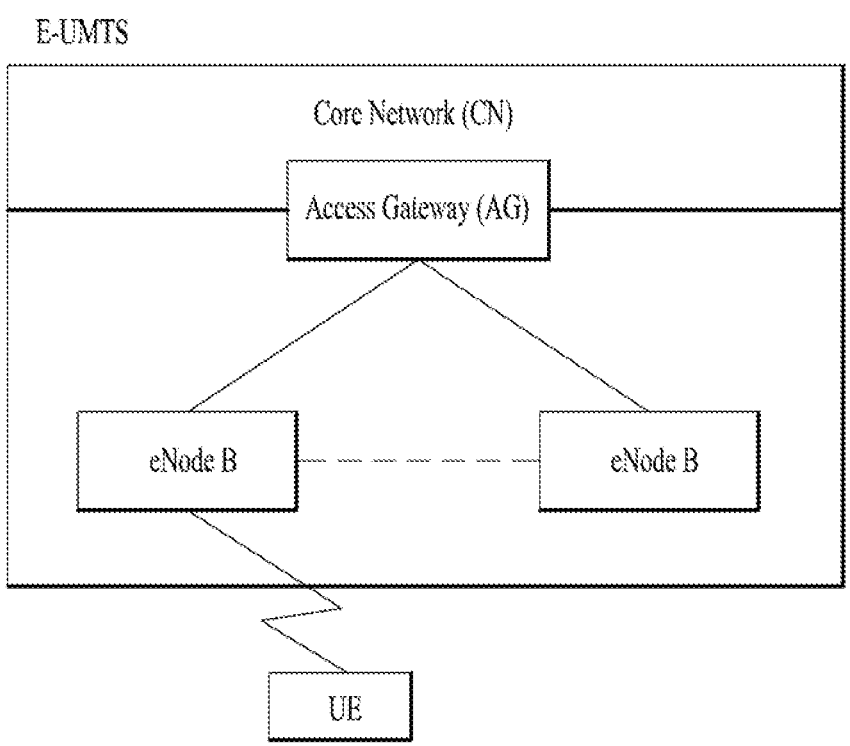
FIG. 1 is a diagram showing a network structure of an Evolved Universal Mobile Telecommunications System (E-UMTS) as an example of a wireless communication system.
Figure 2A:
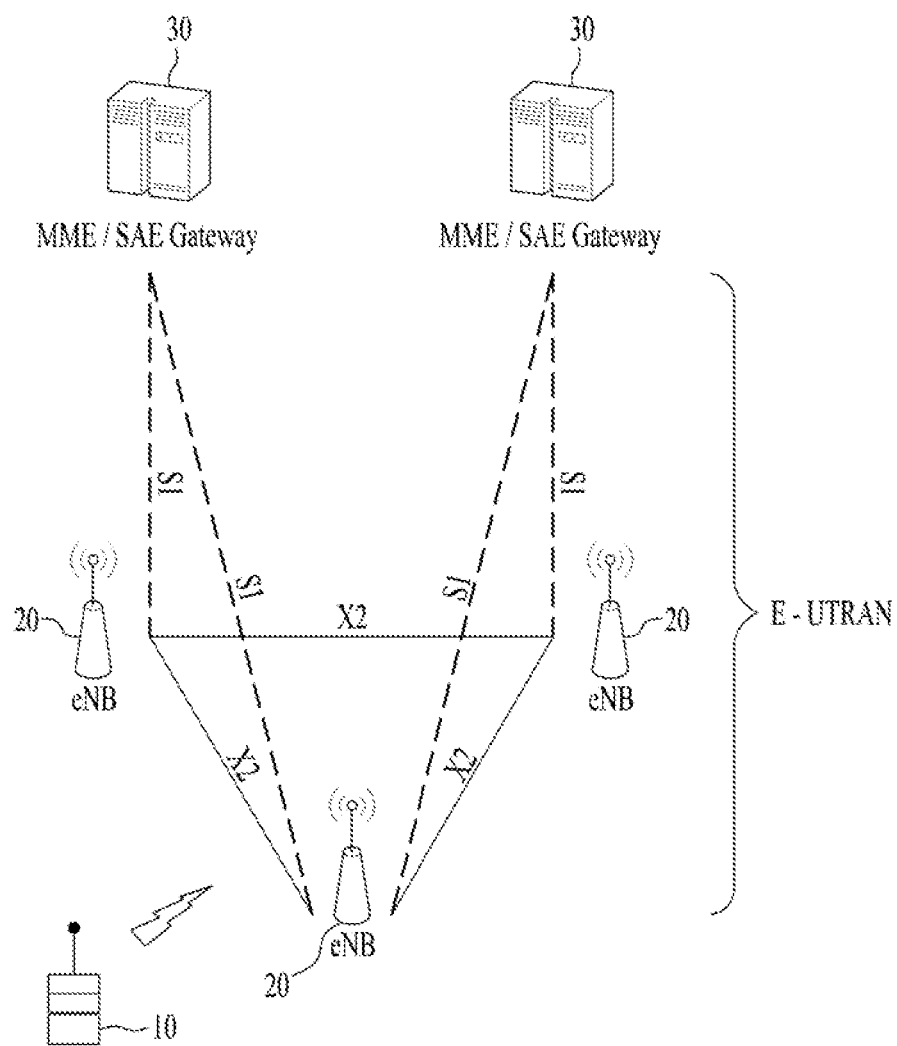
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
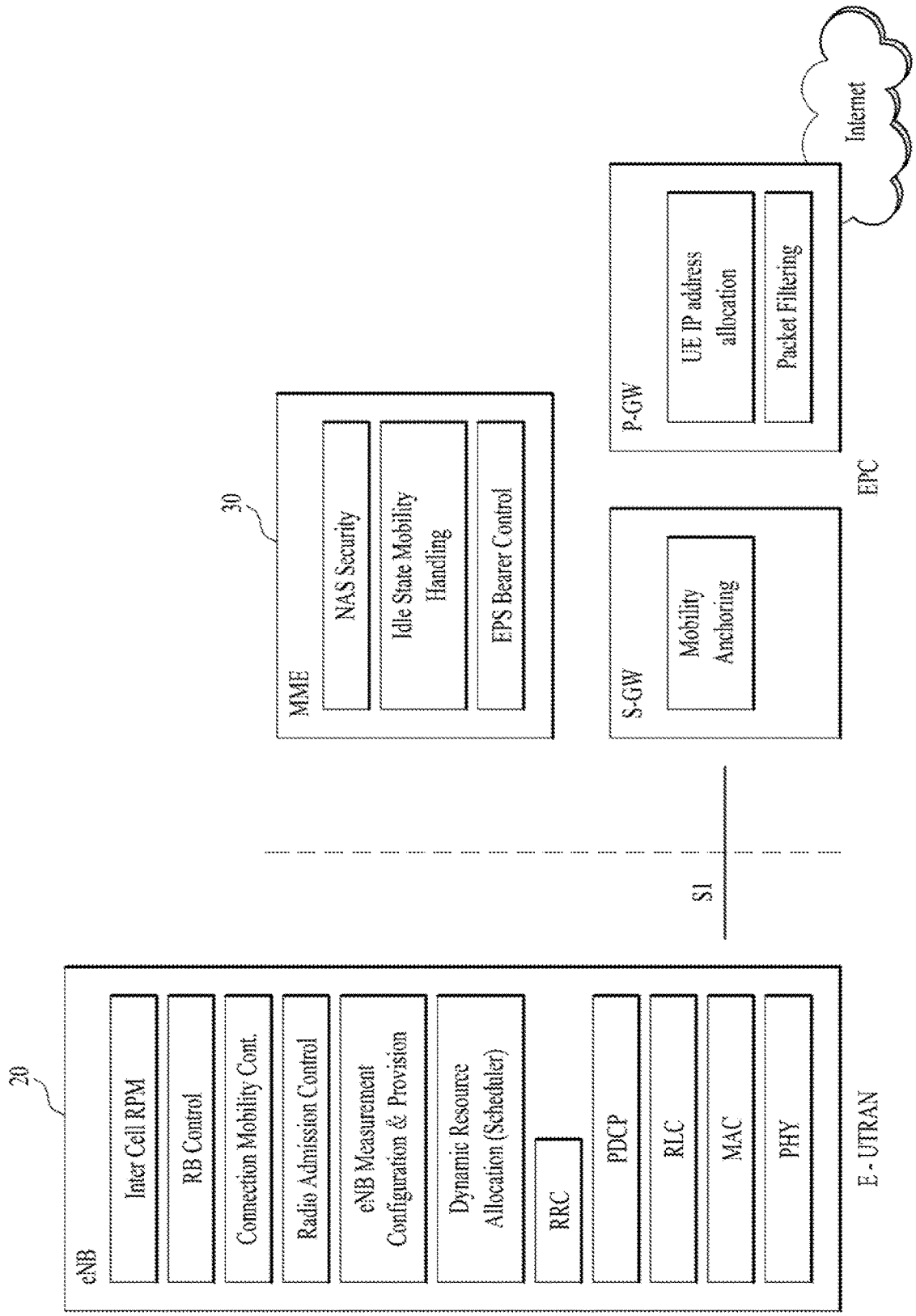
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
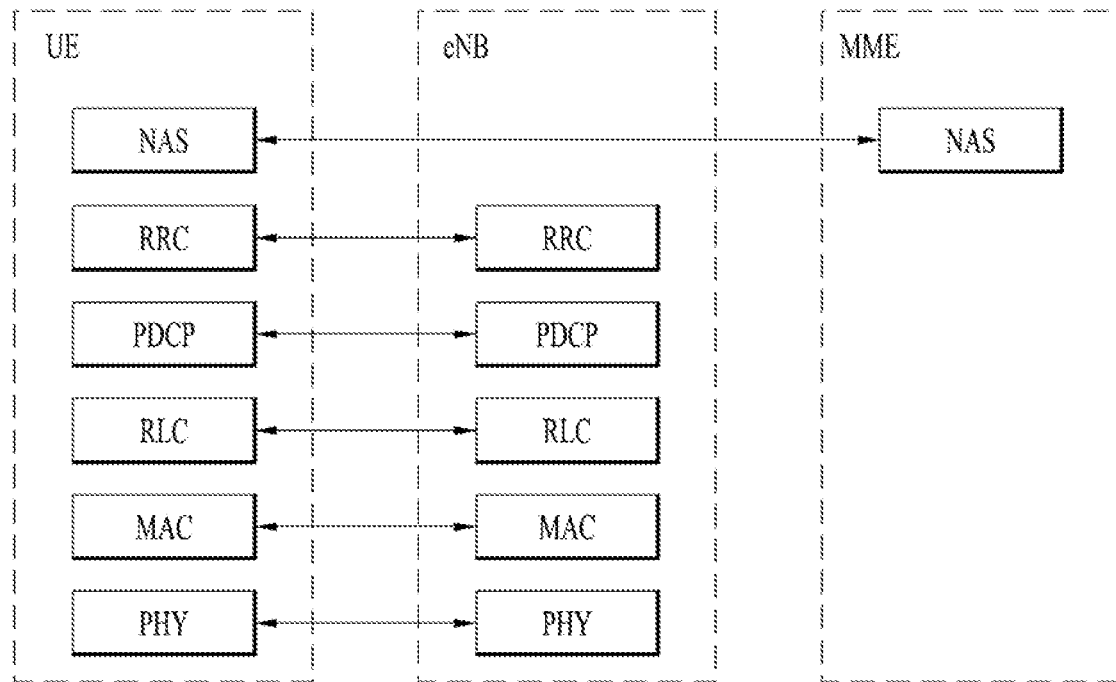
FIG. 3 is a diagram showing a control plane and a user plane of a radio interface protocol between a UE and an E-UTRAN based on a 3rd generation partnership project (3GPP) radio access network standard.
Figure 3:
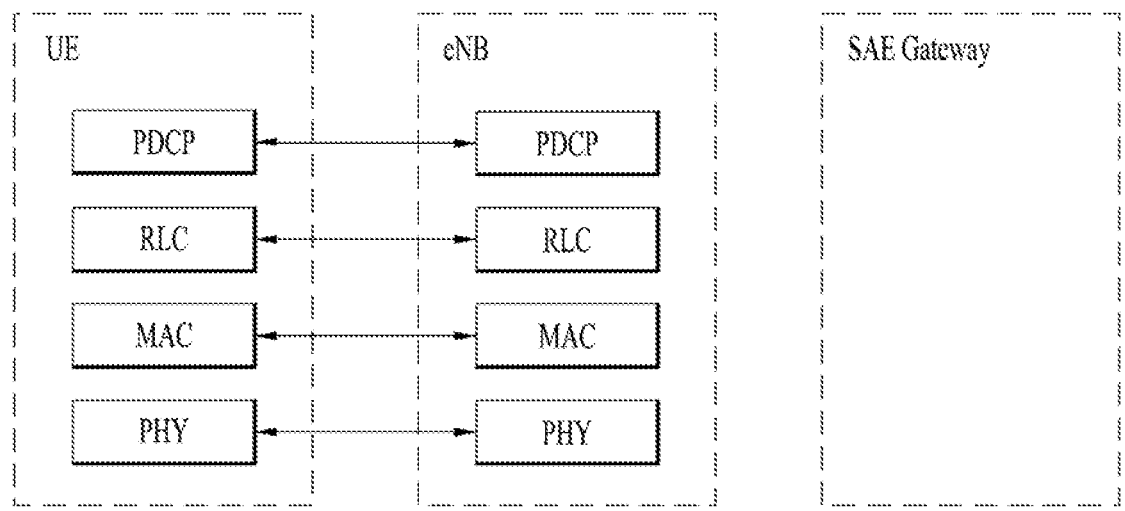

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4A:
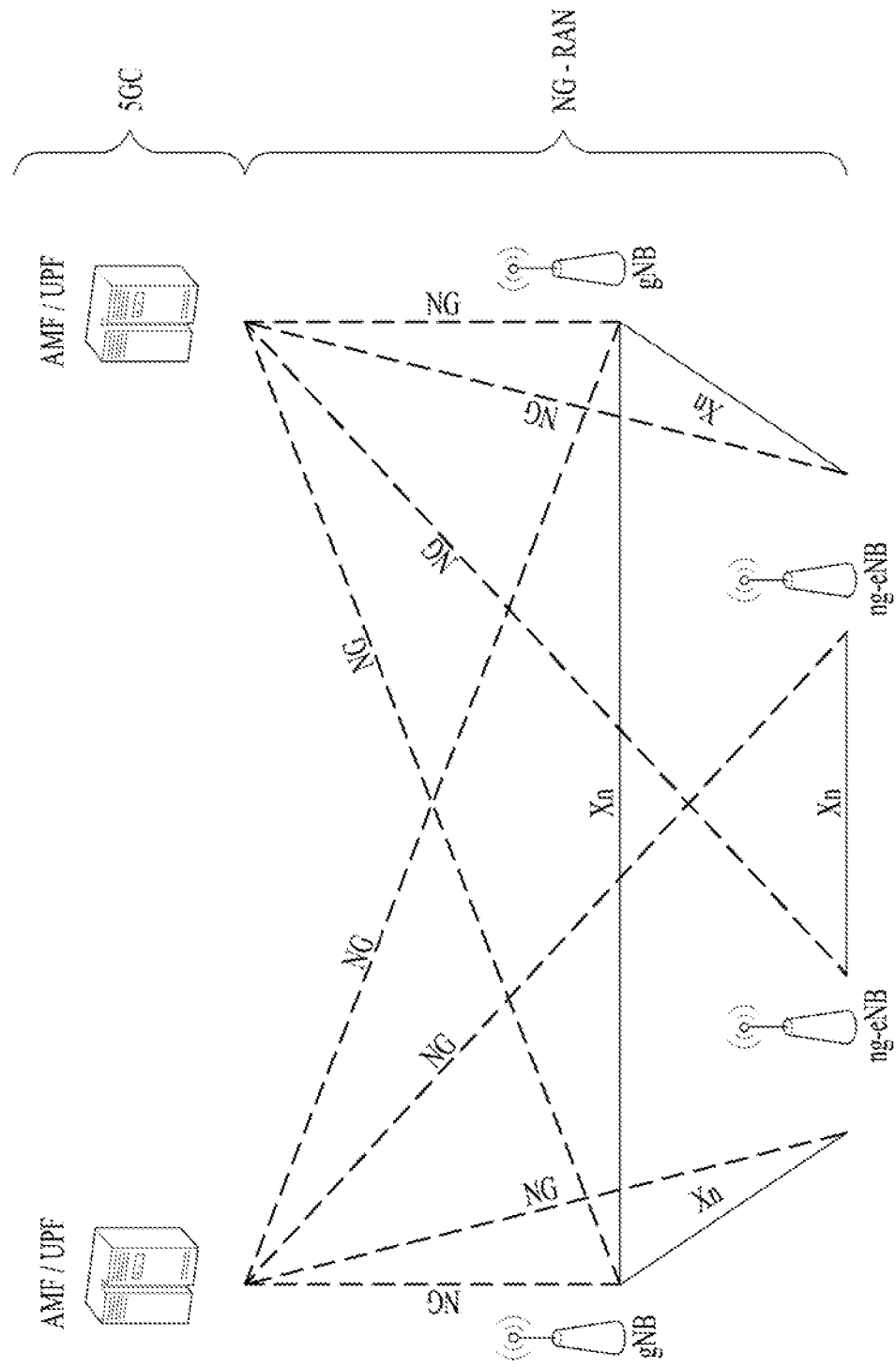
FIG. 4A is a block diagram illustrating network structure of NG Radio Access Network (NG-RAN) architecture.
Figure 4B:
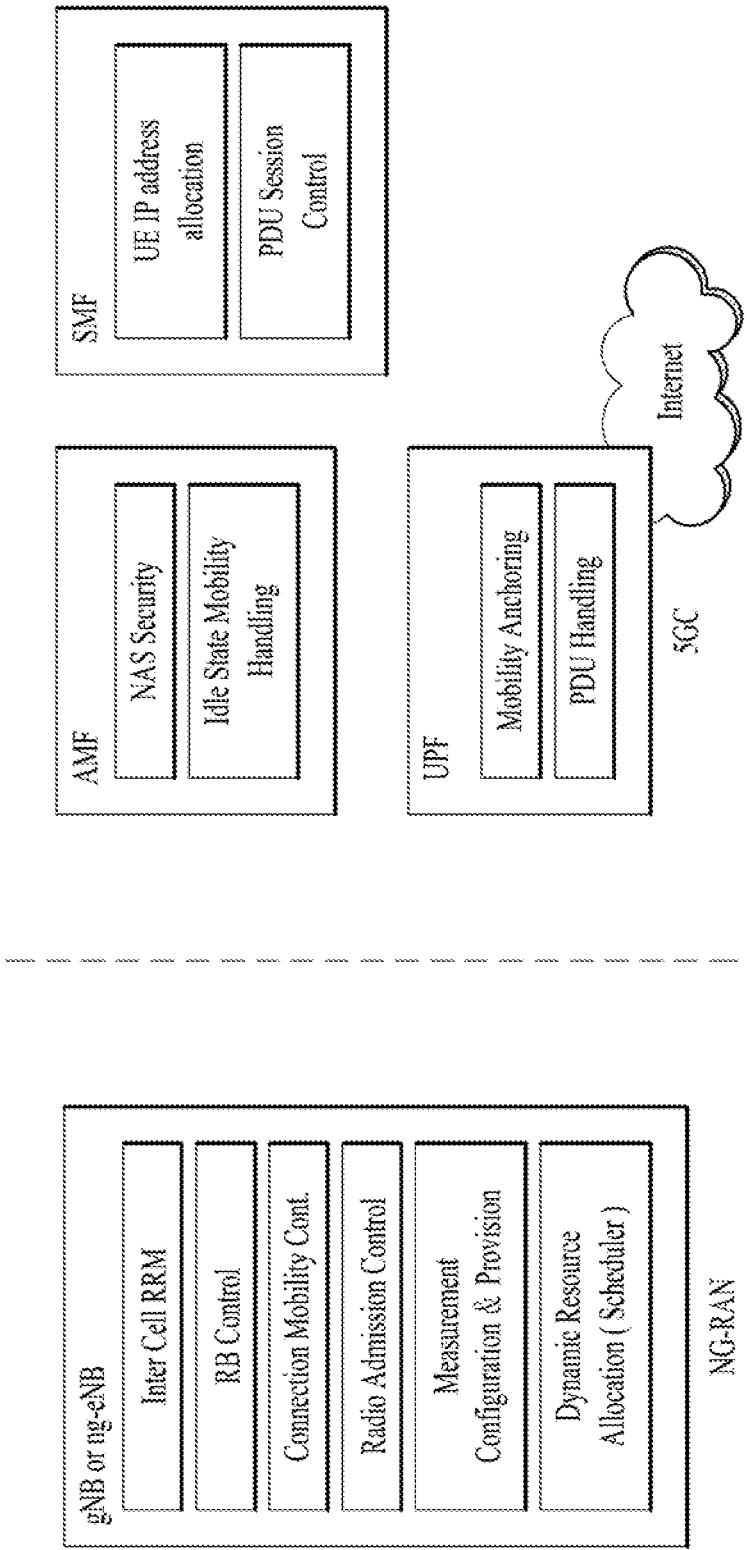
FIG. 4B is a block diagram depicting architecture of functional Split between NG-RAN and 5G Core Network (5GC).

FIG. 4A is a block diagram illustrating network structure of NG Radio Access Network (NG-RAN) architecture, and FIG. 4B is a block diagram depicting architecture of functional Split between NG-RAN and 5G Core Network (5GC).

An NG-RAN node is a gNB, providing NR user plane and control plane protocol terminations towards the UE, or an ng-eNB, providing E-UTRA user plane and control plane protocol terminations towards the UE.

The gNBs and ng-eNBs are interconnected with each other by means of the Xn interface. The gNBs and ng-eNBs are also connected by means of the NG interfaces to the 5GC, more specifically to the AMF (Access and Mobility Management Function) by means of the NG-C interface and to the UPF (User Plane Function) by means of the NG-U interface.

The Xn Interface includes Xn user plane (Xn-U), and Xn control plane (Xn-C). The Xn User plane (Xn-U) interface is defined between two NG-RAN nodes. The transport network layer is built on IP transport and GTP-U is used on top of UDP/IP to carry the user plane PDUs. Xn-U provides non-guaranteed delivery of user plane PDUs and supports the following functions: i) Data forwarding, and ii) Flow control. The Xn control plane interface (Xn-C) is defined between two NG-RAN nodes. The transport network layer is built on SCTP on top of IP. The application layer signaling protocol is referred to as XnAP (Xn Application Protocol). The SCTP layer provides the guaranteed delivery of application layer messages. In the transport IP layer point-to-point transmission is used to deliver the signaling PDUs. The Xn-C interface supports the following functions: i) Xn interface management, ii) UE mobility management, including context transfer and RAN paging, and iii) Dual connectivity.

The NG Interface includes NG User Plane (NG-U) and NG Control Plane (NG-C). The NG user plane interface (NG-U) is defined between the NG-RAN node and the UPF. The transport network layer is built on IP transport and GTP-U is used on top of UDP/IP to carry the user plane PDUs between the NG-RAN node and the UPF. NG-U provides non-guaranteed delivery of user plane PDUs between the NG-RAN node and the UPF.

The NG control plane interface (NG-C) is defined between the NG-RAN node and the AMF. The transport network layer is built on IP transport. For the reliable transport of signaling messages, SCTP is added on top of IP. The application layer signaling protocol is referred to as NGAP (NG Application Protocol). The SCTP layer provides guaranteed delivery of application layer messages. In the transport, IP layer point-to-point transmission is used to deliver the signaling PDUs.

NG-C provides the following functions: i) NG interface management, ii) UE context management, iii) UE mobility management, iv) Configuration Transfer, and v) Warning Message Transmission.

The gNB and ng-eNB host the following functions: i) Functions for Radio Resource Management: Radio Bearer Control, Radio Admission Control, Connection Mobility Control, Dynamic allocation of resources to UEs in both uplink and downlink (scheduling), ii) IP header compression, encryption and integrity protection of data, iii) Selection of an AMF at UE attachment when no routing to an AMF can be determined from the information provided by the UE, iv) Routing of User Plane data towards UPF(s), v) Routing of Control Plane information towards AMF, vi)

Connection setup and release, vii) Scheduling and transmission of paging messages (originated from the AMF), viii) Scheduling and transmission of system broadcast information (originated from the AMF or O&M), ix) Measurement and measurement reporting configuration for mobility and scheduling, x) Transport level packet marking in the uplink, xi) Session Management, xii) Support of Network Slicing, and xiii) QoS Flow management and mapping to data radio bearers. The Access and Mobility Management Function (AMF) hosts the following main functions: i) NAS signaling termination, ii) NAS signaling security, iii) AS Security control, iv) Inter CN node signaling for mobility between 3GPP access networks, v) Idle mode UE Reachability (including control and execution of paging retransmission), vi) Registration Area management, vii) Support of intra-system and inter-system mobility, viii) Access Authentication, ix) Mobility management control (subscription and policies), x) Support of Network Slicing, and xi) SMF selection.

The User Plane Function (UPF) hosts the following main functions: i) Anchor point for Intra-/Inter-RAT mobility (when applicable), ii) External PDU session point of interconnect to Data Network, iii) Packet inspection and User plane part of Policy rule enforcement, iv) Traffic usage reporting, v) Uplink classifier to support routing traffic flows to a data network, vi) QoS handling for user plane, e.g. packet filtering, gating, UL/DL rate enforcement, and vii) Uplink Traffic verification (SDF to QoS flow mapping).

The Session Management function (SMF) hosts the following main functions: i) Session Management, ii) UE IP address allocation and management, iii) Selection and control of UP function, iv) Configures traffic steering at UPF to route traffic to proper destination, v) Control part of policy enforcement and QoS, vi) Downlink Data Notification.

Figure 5:
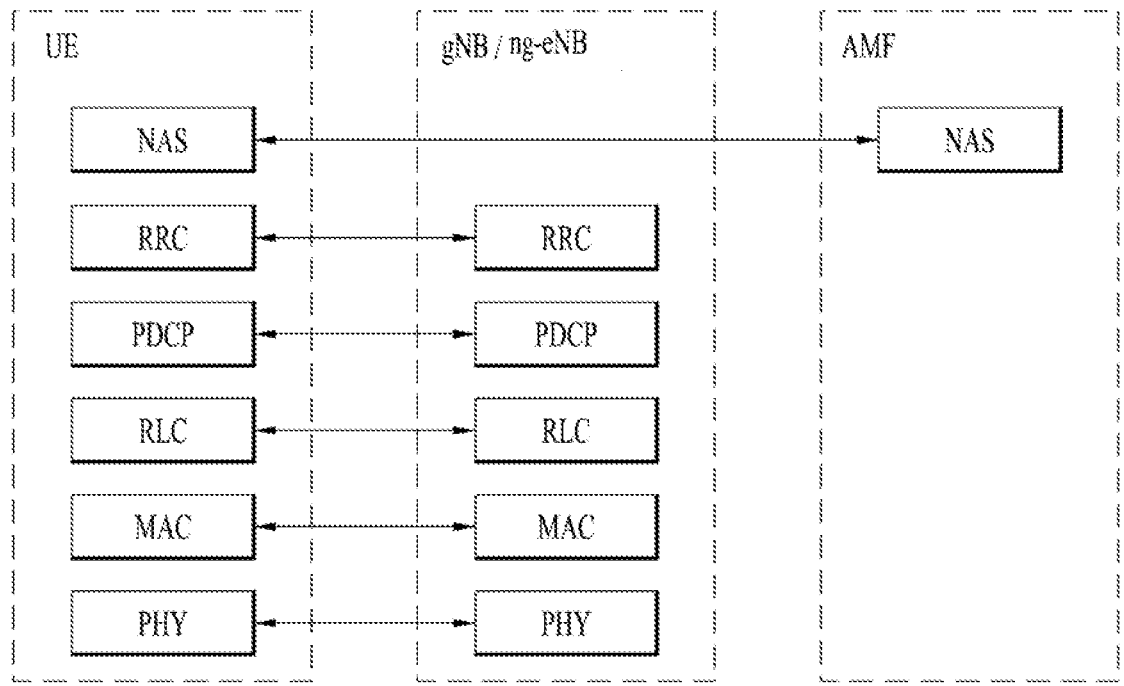
FIG. 5 is a diagram showing a control plane and a user plane of a radio interface protocol between a UE and a NG-RAN based on a 3rd generation partnership project (3GPP) radio access network standard.
Figure 5:
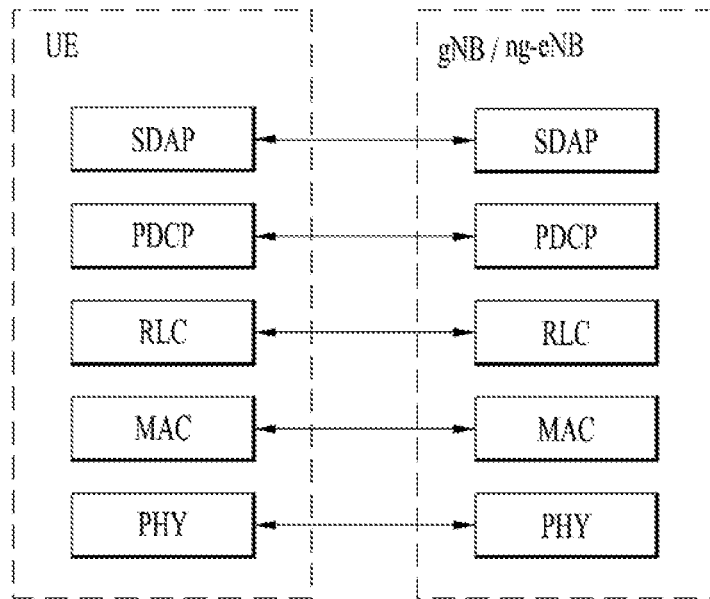

FIG. 5 is a diagram showing a control plane and a user plane of a radio interface protocol between a UE and a NG-RAN based on a 3rd generation partnership project (3GPP) radio access network standard.

The user plane protocol stack contains Phy, MAC, RLC, PDCP and SDAP (Service Data Adaptation Protocol) which is newly introduced to support 5G QoS model.

The main services and functions of SDAP entity include i) Mapping between a QoS flow and a data radio bearer, and ii) Marking QoS flow ID (QFI) in both DL and UL packets. A single protocol entity of SDAP is configured for each individual PDU session.

At the reception of an SDAP SDU from upper layer for a QoS flow, the transmitting SDAP entity may map the SDAP SDU to the default DRB if there is no stored QoS flow to DRB mapping rule for the QoS flow. If there is a stored QoS flow to DRB mapping rule for the QoS flow, the SDAP entity may map the SDAP SDU to the DRB according to the stored QoS flow to DRB mapping rule. And the SDAP entity may construct the SDAP PDU and deliver the constructed SDAP PDU to the lower layers.

Figure 6:
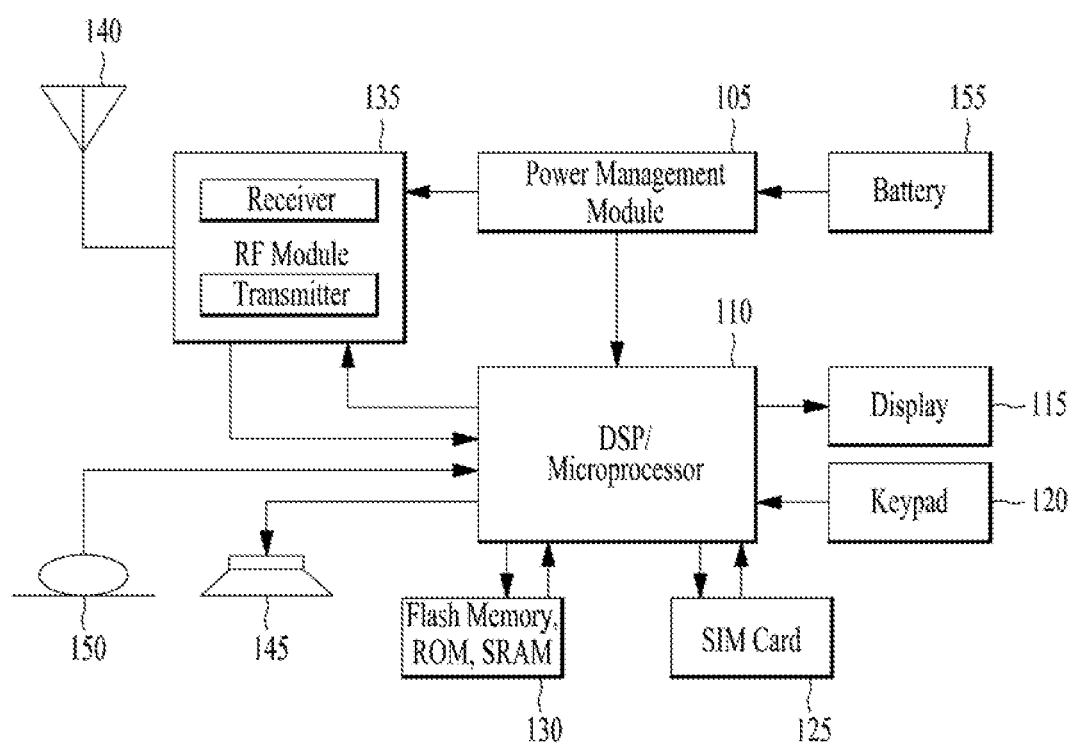
FIG. 6 is a block diagram of a communication apparatus according to an embodiment of the present invention.

FIG. 6 is a block diagram of a communication apparatus according to an embodiment of the present invention.

The apparatus shown in FIG. 6 can be a user equipment (UE) and/or eNB or gNB adapted to perform the above mechanism, but it can be any apparatus for performing the same operation.

As shown in FIG. 6, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 6 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 6 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Figure 7A:
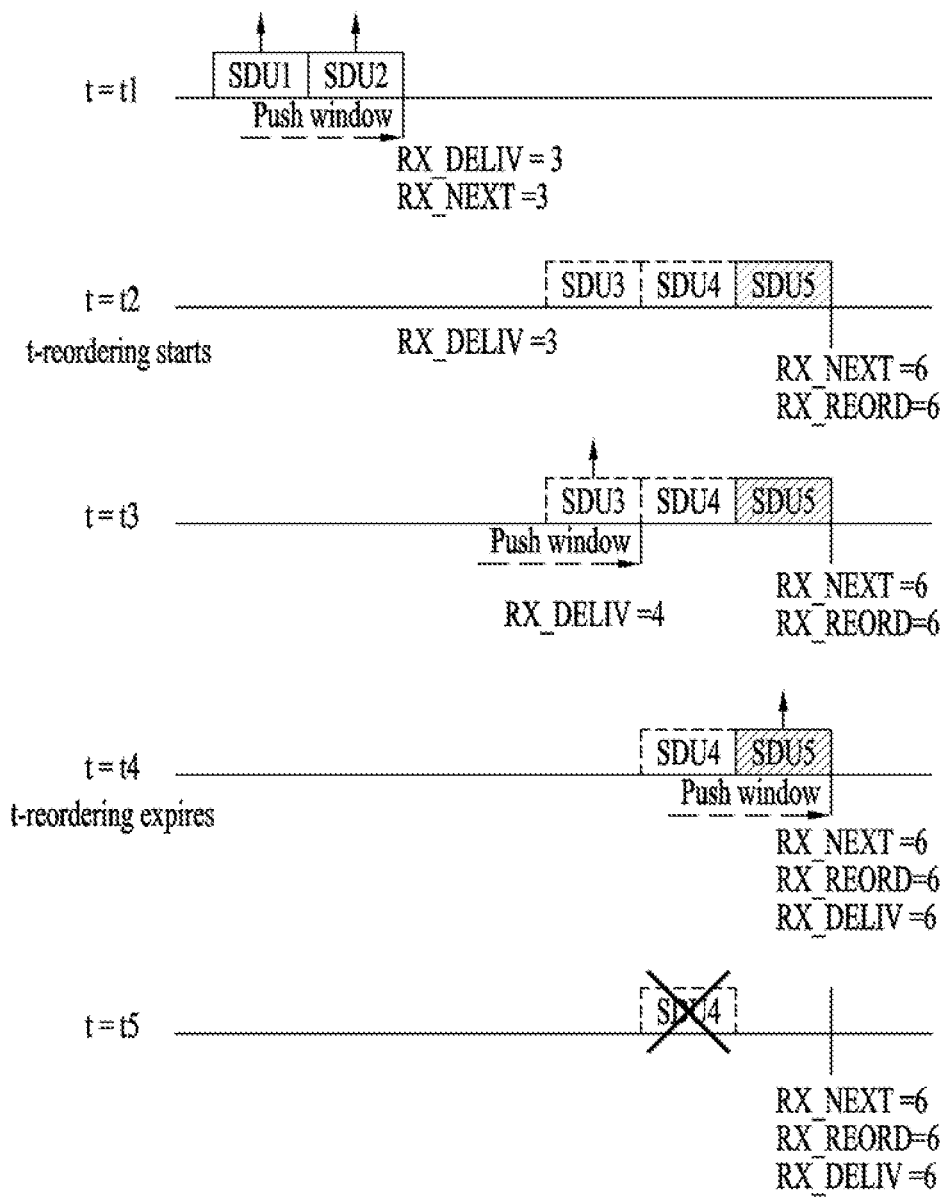
FIG. 7A is an example that a reordering function is performed when out-of-order delivery is not supported.
Figure 7B:
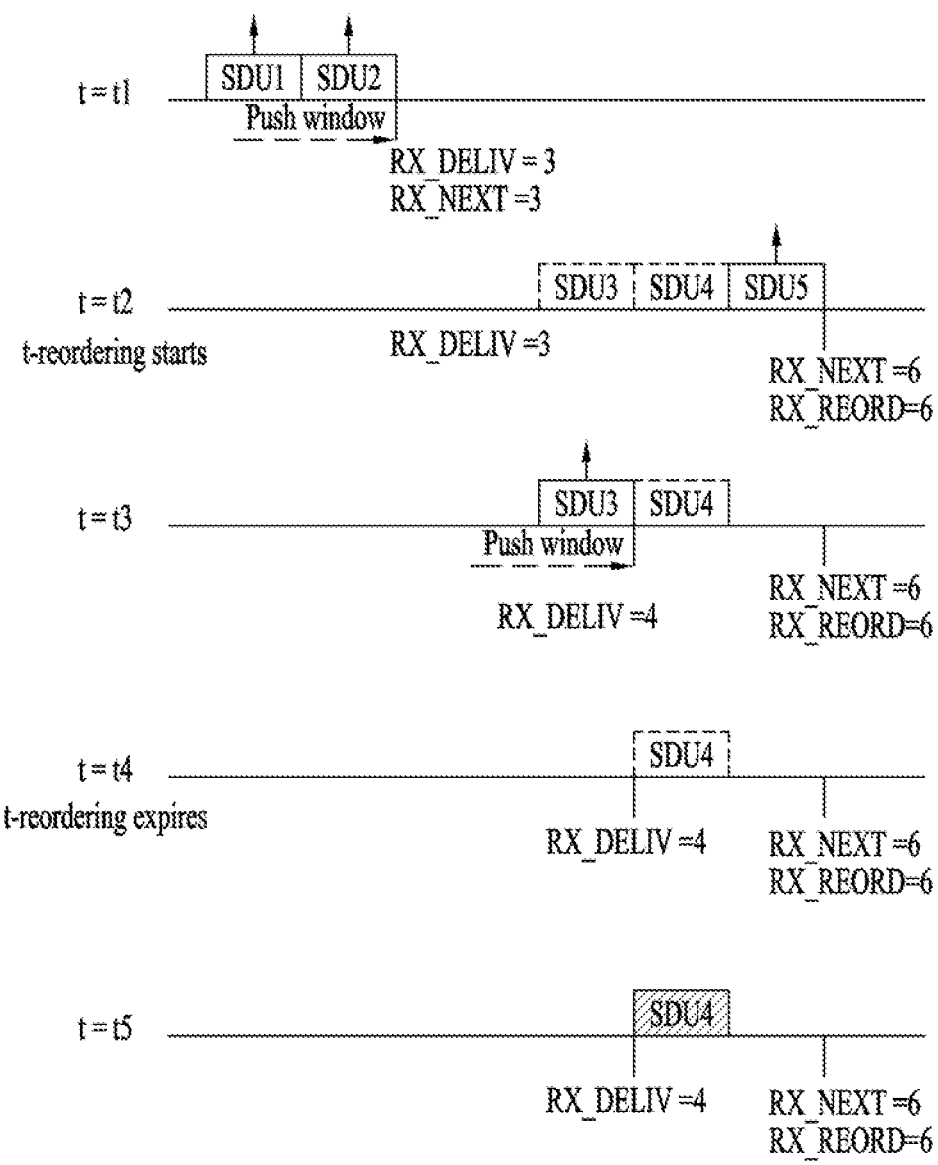
FIG. 7B is an example that a reordering function is performed when out-of-order delivery is supported.

FIG. 7A is an example that a reordering function is performed when out-of-order delivery is not supported, and FIG. 7B is an example that a reordering function is performed when out-of-order delivery is supported.

In LTE, for split bearers in DC (only support for RLC AM) and LWA bearers (only support for RLC AM and RLC UM), PDCP PDU routing for transmission and PDCP PDU reordering for reception are supported, so the PDCP reordering function is not performed by default in the LTE. But in NR, the PDCP reordering function is performed by default instead of RLC entity (i.e. RLC entity supports only out-of-order delivery), and the PDCP entity can supports out-of-order delivery.

In LTE, the reordering timer is started when an out-of-order PDCP SDU is received from a lower layer in a reordering window associated with the reordering timer.

Here, the reordering timer is a timer that operates during a reordering function of the PDCP entity. The reordering timer starts when an out-of-order SDU is received from the lower layer, and out-of-order SDUs are stored in a reordering buffer while the reordering timer is running. The reordering timer expires, and the stored out-of-order SDUs are delivered to the upper layer in sequentially.

The term of 'in sequentially' means in ascending order of COUNT values associated with PDCP SDUs in the reordering buffer.

The out-of-order SDU is a SDU other than a next SDU expected to be received from a lower layer. Since PDUs other than the reordering window are discarded as soon as they are received, in this case, it is limited that the SDU other than a next SDU expected to be received is received in the reordering window.

The PDCP entity manages 'Next_PDCP_RX_SN', 'Last_Submitted_PDCP_RX_SN', and 'Reordering_PDCP_RX_COUNT' for the reordering function.

'Next_PDCP_RX_SN' is a state variable indicating the next expected PDCP sequence number (SN) by the receiver for a given PDCP entity. Since 'Next_PDCP_RX_SN' indicates the next PDCP Sequence Number (SN) value expected by the receiving PDCP entity, it is possible to know whether it is an out-of-order SDU by using 'Next_PDCP_RX_SN'. That is, if a SDU having a PDCP SN value equal to 'Next_PDCP_RX_SN' is received from the lower layer, the SDU is an in-order SDU. If a SDU having a PDCP SN larger than 'Next_PDCP_RX_SN' is received from the lower layer, the SDU is an out-of-order SDU.

Actually, 'Next_PDCP_RX_SN' is defined using term of 'SDU'. Since the receiving PDCP entity receives a 'PDU' from the lower layer and process and transmits a 'SDU' corresponding to the 'PDU' to the upper layer, the term of 'SDU' may be used interchangeably with the term of 'PDU' in the reordering function.

'Reordering_PDCP_RX_COUNT' is a state variable indicating a COUNT value following the COUNT value associated with the PDCP Data PDU which triggered reordering timer. The reordering timer is triggered when an out-of-order PDU is received from the lower layer. So 'Reordering PDCP_RX_COUNT' is updated to a COUNT value following a COUNT value associated with the out-of-order PDCP PDU (i.e. set Reordering_PDCP_RX_COUNT to the COUNT value associated to RX_HFN and Next_PDCP_RX_SN).

'Last_Submitted_PDCP_RX_SN' is a state variable indicating the PDCP SN of the last PDCP SDU delivered to the upper layers. According to current specification, if received PDCP SN-Last_Submitted_PDCP_RX_SN>Reordering_Window or 0<=Last_Submitted_PDCP_RX_SN-received PDCP SN<Reordering_Window, the PDCP PDU is discarded. And only when a received PDCP SN is equal to Last_Submitted_PDCP_RX SN+1 or received PDCP SN is equal to Last_Submitted_PDCP_RX_SN−Maximum_PDCP_SN or when the t-reordering timer is expired, the reordering window is shifted while 'Last_Submitted_PDCP_RX_SN' is updated. By definition, 'Last_Submitted_PDCP_RX_SN' means the highest PDCP SN among PDCP SN values of the PDCP SDU stored in the reordering buffer, so 'Last_Submitted_PDCP_RX_SN+1' indicates the lower edge of the next reordering window.

According to current specification, for DRBs mapped on RLC AM and for LWA bearers, the PDCP entity shall use the reordering function as specified in this section when i) the PDCP entity is associated with two AM RLC entities, or ii) the PDCP entity is configured for a LWA bearer.

When the reordering function is used, at reception of a PDCP Data PDU from lower layers, the UE shall discard the PDCP PDU when the PDCP PDU is received outside the reordering window (i.e. if received PDCP SN−Last_Submitted_PDCP_RX_SN>Reordering_Window or 0<=Last_Submitted_PDCP_RX_SN-received PDCP SN<Reordering_Window).

Else if an in-order PDU is received within a reordering window (i.e. if received PDCP SN<Next_PDCP_RX_SN), the UE shall use COUNT based on RX_HFN and the received PDCP SN for deciphering the PDCP PDU.

Else if an out-of-order PDU is received within a reordering window (i.e. received PDCP SN>=Next_PDCP_RX_SN), the UE shall use COUNT based on RX_HFN and the received PDCP SN for deciphering the PDCP PDU, and set Next_PDCP_RX_SN to the received PDCP SN+1. If Next_PDCP_RX_SN is larger than Maximum_PDCP_SN, Next_PDCP_RX_SN is set to 0, and RX_HFN is incremented by one.

When an out-of-order PDU is received within a reordering window, and if t-Reordering is not running, the UE starts t-Reordering, and sets Reordering_PDCP_RX_COUNT to the COUNT value associated to RX_HFN and Next_PDCP_RX_SN.

If received PDCP SN=Last_Submitted_PDCP_RX_SN+1 or received PDCP SN=Last_Submitted_PDCP_RX_SN−Maximum_PDCP_SN, the UE shall deliver to upper layers in ascending order of the associated COUNT value. That is, all stored PDCP SDU(s) with consecutively associated COUNT value(s) starting from the COUNT value associated with the received PDCP PDU. And the UE shall set Last_Submitted_PDCP_RX_SN to the PDCP SN of the last PDCP SDU delivered to upper layers.

When a reordering timer expires, the UE shall deliver to upper layers in ascending order of the associated COUNT value: i) all stored PDCP_ SDU(s) with associated COUNT value(s) less than Reordering_PDCP_RX_COUNT, and ii) all stored PDCP_ SDU(s) with consecutively associated COUNT value(s) starting from Reordering_PDCP_RX_COUNT. And the UE shall set Last_Submitted_PDCP_RX_SN to the PDCP SN of the last PDCP SDU delivered to upper layers. If there is at least one stored PDCP SDU, the UE starts t-Reordering, and sets Reordering_PDCP_RX_COUNT to the COUNT value associated to RX_HFN and Next_PDCP_RX_SN.

Meanwhile, the state variable described above is a term used in LTE, and NR uses a different variable. The term is different, but the reordering function is performed identically.

In NR terminology, 'Last_Submitted PDCP_RX_SN' corresponds to 'RX_DELIV', 'Reordering_PDCP_RX COUNT' corresponds to 'RX_REORD', and 'Next_PDCP_RX_SN' corresponds to 'RX_NEXT'.

The difference between LTE and NR is that the PDCP entity manages the sequence number (SN) of SDU. However, it is the same as NR to derive COUNT by adding HFN to SN.

The PDCP entity manages 'RX_NEXT', 'RX_DELIV', and 'RX_REORD' for the reordering function.

At reception of a PDCP Data PDU from lower layers, the receiving PDCP entity shall determine a COUNT value of the received PDCP Data PDU, i.e. RCVD_COUNT (a COUNT of the received PDCP Data PDU=[RCVD_HFN, RCVD_SN]), as follows:

If RCVD_SN<SN(RX_DELIV)−Window_Size, RCVD_HFN is set to HFN(RX_DELIV)+1.

Else if RCVD_SN>=SN(RX_DELIV)+Window_Size, RCVD_HFN=HFN(RX_DELIV)−1.

Else RCVD_HFN=HFN(RX_DELIV).

And, RCVD_COUNT is composed of [RCVD_HFN, RCVD_SN].

After determining the COUNT value of the received PDCP Data PDU=RCVD_COUNT, at reception of a PDCP Data PDU from lower layers, the UE shall discard the PDCP PDU when the PDCP PDU is received outside the reordering window (i.e. if RCVD_COUNT<RX_DELIV, or the PDCP Data PDU with COUNT=RCVD_COUNT has been received before).

Else if an in-order PDU is received within a reordering window, the UE stores store the resulting PDCP SDU in the reception buffer.

Else if an out-of-order PDU is received within a reordering window (i.e. RCVD_COUNT>=RX_NEXT), the UE shall updates RX_NEXT to RCVD_COUNT+1.

When an out-of-order PDU is received within a reordering window, and if t-Reordering is not running, the UE starts t-Reordering, and sets update RX_REORD to RX_NEXT.

If RCVD_COUNT=RX_DELIV, the UE shall deliver to upper layers in ascending order of the associated COUNT value after performing header decompression, if not decompressed before. That is, all stored PDCP SDU(s) with consecutively associated COUNT value(s) starting from COUNT=RX_DELIV. And then RX_DELIV has to be updated like as LTE.

Also, when a reordering timer expires, the UE shall deliver to upper layers in ascending order of the associated COUNT value after performing header decompression, if not decompressed before: i) all stored PDCP SDU(s) with associated COUNT value(s)<RX_REORD, and ii) all stored PDCP SDU(s) with consecutively associated COUNT value(s) starting from RX_REORD. And then RX_DELIV has to be updated like as LTE.

'RX_NEXT' is a state variable indicating a COUNT value of the next PDCP SDU expected to be received. Since 'RX_NEXT' indicates the next COUNT value expected by the receiving PDCP entity, it is possible to know whether it is an out-of-order SDU by using RX_NEXT value.

'RX_REORD' is a state variable indicating a COUNT value following the COUNT value associated with the PDCP Data PDU which triggered reordering timer.

The reordering timer is triggered when an out-of-order PDU is received from the lower layer. So 'RX_REORD' is updated to a COUNT value following a COUNT value associated with the out-of-order PDCP PDU (i.e. RX_NEXT).

The problem is the definition of 'RX_DELIV'. In LR, 'RX_DELIV' indicates the COUNT value of a lower edge of the reordering window. So, according to current specification, if RCVD_COUNT<RX_DELIV, the PDCP Data PDU is discarded. And only when RCVD_COUNT=RX_DELIV, or when the t-reordering timer is expired, the reordering window is shifted while 'RX_DELIV' is updated (i.e. update RX_DELIV to the COUNT value of the last PDCP SDU delivered to upper layers+1).

However, when the PDCP entity is configured with out-of-order delivery, since the UE shall deliver the PDCP SDU to upper layer as soon as it is received, i.e. the UE does not store the PDCP SDU in the reordering buffer, in-sequence delivery of the PDCP SDU is not guaranteed. As a result, 'a COUNT value of the last PDCP SDU delivered to the upper layers+1' may be not shifted to the lower edge of the next reordering window.

In legacy, when t-Reordering expires, the receiving PDCP entity shall deliver to upper layers in ascending order of the associated COUNT value after performing header decompression: i) all stored PDCP SDU(s) with associated COUNT value(s)<RX_REORD, and ii) all stored PDCP SDU(s) with consecutively associated COUNT value(s) starting from RX REORD. And the receiving PDCP entity shall updates RX_DELIV to the COUNT value of the last PDCP SDU delivered to upper layers+1.

For example, FIG. 7A is an example that a reordering function is performed when out-of-order delivery is not supported.

At t=t1, when SDUs 1 and 2 are received from a lower layer, the PDCP entity delivers SDUs 1 and 2 to upper layer in ascending order of the COUNT value. And RX_NEXT and RX_DELIV are updated to 3, and RX REORD=0. In this case, RX_DELIV is lower edge of the reordering window.

At t=t2, when out-of-sequence SDU5 is received from a lower layer, the PDCP entity stores it. And RX_NEXT and RX_REORD are updated to 6, and RX_DELIV is not updated. And a reordering timer is started for SDU3 and SDU4.

At t=t3, while the reordering timer is running, when the SDU3 is received from lower layer, the PDCP entity delivers the SDU3 to upper layer and RX_DELIV is updated to 4.

At t=t4, When the reordering timer expires, SDU5 is delivered to upper layer, and RX_DELIV is updated to 6. RX_NEXT and RX_REORD are not updated.

At t=t5, when SDU4 is received, the SDU4 is discarded because the received COUNT value is smaller than RX_DELIV (i.e. RCVD_COUNT<RX_DELIV).

When the reordering timer expires, while SDU5 is delivered to upper layer, RX_DELIV is updated to 6. There is no problem even if you follow the previous definition. The problem occurs when out-of-order delivery is configured.

For example, FIG. 7B is an example that a reordering function is performed when out-of-order delivery is supported.

At t=t1, when SDUs 1 and 2 are received from a lower layer, the PDCP entity delivers SDUs 1 and 2 to upper layer in ascending order of the COUNT value. And RX_NEXT and RX_DELIV are updated to 3, and RX_REORD=0. In this case, RX_DELIV is lower edge of the reordering window.

At t=t2, when out-of-sequence SDU5 is received from a lower layer, the PDCP entity doesn't store and deliver it immediately. And RX_NEXT and RX_REORD are updated to 6, and RX_DELIV is not updated. And a reordering timer is started for SDU3 and SDU4.

At t=t3, while the reordering timer is running, when the SDU3 is received from lower layer, the PDCP_ entity delivers the SDU3 to upper layer and RX_DELIV is updated to 4.

At t=t4, when the reordering timer expires, there is no PDCP SDUs to be delivered to upper layer, but the RX_DELIV has to be updated. According to the previous definition, the RX_DELIV is not to be updated because the last PDCP SDU delivered to upper layers is not a SDU=5 but SDU=3.

If so, when SDU4 is received at t=t5, SDU4 cannot be discarded because the received COUNT value is not smaller than RX_DELIV. If the discarded SDUs changes depending on whether out-of-order delivery is configured, an error handling in the PDCP function is difficult. Conversely, if SDU4 is loss during transmission, it is a problem that PDCP entity continues to performing the reordering function while waiting for SDU4 that is not transmitted. It has to be changed to cover both cases. So, we proposes a new handling of reordering timer and RX_DELIV update when out-of-order delivery is configured.

Figure 8:
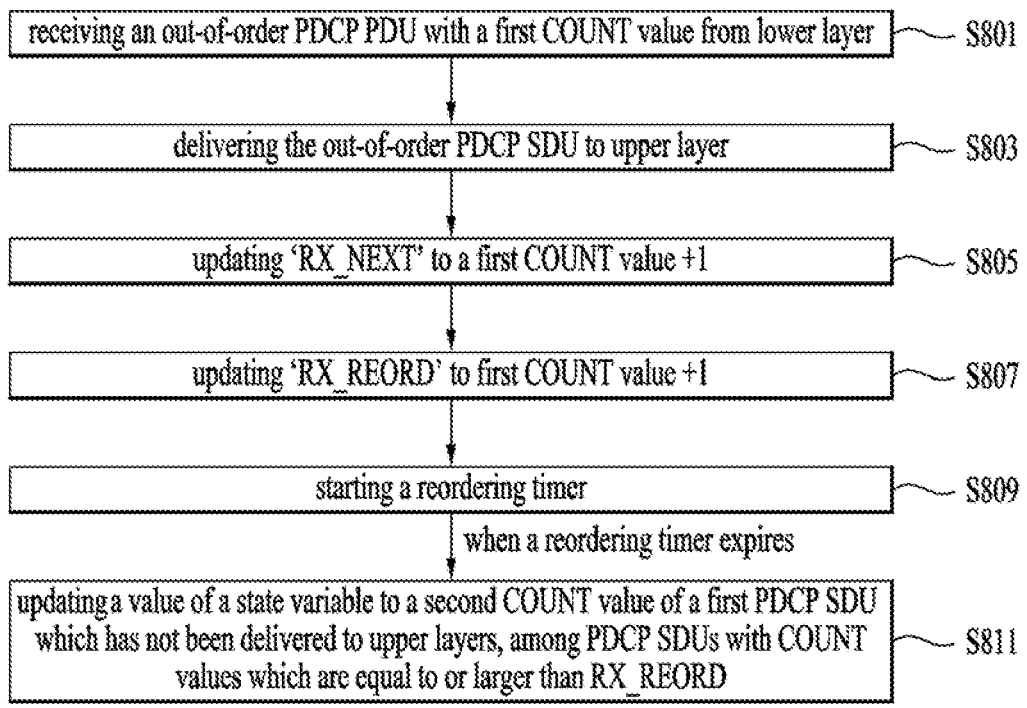
FIG. 8 is a conceptual diagram for handling state variables of a PDCP entity in wireless communication system according to embodiments of the present invention.

FIG. 8 is a conceptual diagram for handling state variables of a PDCP entity in wireless communication system according to embodiments of the present invention.

Let's assume that the PDCP entity is configured with out-of-order delivery. When the PDCP entity is configured with out-of-order delivery, the PDCP entity delivers the out-of-order PDCP SDU to the upper layer as soon as the out-of-order PDCP SDU is received from the lower layer without storing the out-of-order PDCP SDU in a reordering buffer.

Preferably, out-of-order delivery is configurable by RRC signaling, and out of order delivery does not affect window status (i.e. RX_DELIV).

When an out-of-order PDCP PDU with a first COUNT value is received from lower layer in a reordering window (S801), the PDCP entity delivers the out-of-order PDCP SDU associated with the out-of-order PDCP PDU to upper layer (S803) and a value of RX_NEXT is updated to a first COUNT value+1 (S805).

If reordering timer is not running and RX_DELIV<RX_NEXT, the PDCP entity updates a value of a RX_REORD to first COUNT value+1 (i.e. RX_NEXT) (S807) and starts a reordering timer (S809).

Preferably, the reordering timer is started when an out-of-order PDCP PDU is received from a lower layer in a reordering window associated with the reordering timer.

Here, the reordering timer is a timer that operates during a reordering function of the PDCP_ entity. The reordering timer starts when an out-of-order PDU is received from the lower layer, and out-of-order SDUs are stored in a reordering buffer while the reordering timer is running. The reordering timer expires, and the stored out-of-order SDUs are delivered to the upper layer sequentially.

The term of 'sequentially' means in ascending order of COUNT values associated with PDCP SDUs in the reordering buffer.

The out-of-order SDU is a SDU other than a next SDU expected to be received from a lower layer. Since PDUs other than the reordering window are discarded as soon as they are received, in this case, it is limited that the PDU other than a next PDU expected to be received is received in the reordering window.

Preferably, RX_NEXT indicates a COUNT value of a next PDCP SDU expected to be received in a reordering window associated with the reordering timer, and RX_REORD indicates a COUNT value following a COUNT value associated with a PDCP Data Protocol Data Unit (PDU) which triggered a reordering timer.

So, the first COUNT value of the out-of-order PDCP SDU is larger than a RX_NEXT indicating a COUNT value of a next PDCP SDU expected to be received in a reordering window associated with the reordering timer.

When the reordering timer expires, we proposes that the PDCP entity updates a value of a state variable based on a second COUNT value of a first PDCP SDU which has not been delivered to upper layers, among PDCP SDUs with COUNT values which are equal to or larger than RX_REORD (S811).

Preferably, the second COUNT value of a first PDCP SDU which has not been delivered to upper layers, among PDCP SDUs with COUNT values which are equal to or larger than RX_REORD is same as a COUNT value of the lower edge of the next reordering window after the reordering timer expires.

Thus, the value of a 'state variable' indicates a lower edge of reordering window. The reordering window spans from 'state variable' to 'state variable'+Window_Size.

Preferably, the second COUNT value of the first PDCP SDU is a lowest COUNT value of a PDCP SDU among PDCP SDUs, which have not been delivered to upper layers, with COUNT values which are equal to or larger than the RX_REORD.

Only when a PDU with a same COUNT as 'state variable' is received or when the t-reordering timer is expired, the reordering window is shifted while 'second state variable' is updated. By definition, the 'state variable' means the lowest COUNT value among COUNT values of the SDUs not transmitted to the upper layer, so 'state variable' indicates the lower edge of the reordering window (e.g. RX_DELIV).

Figure 9:
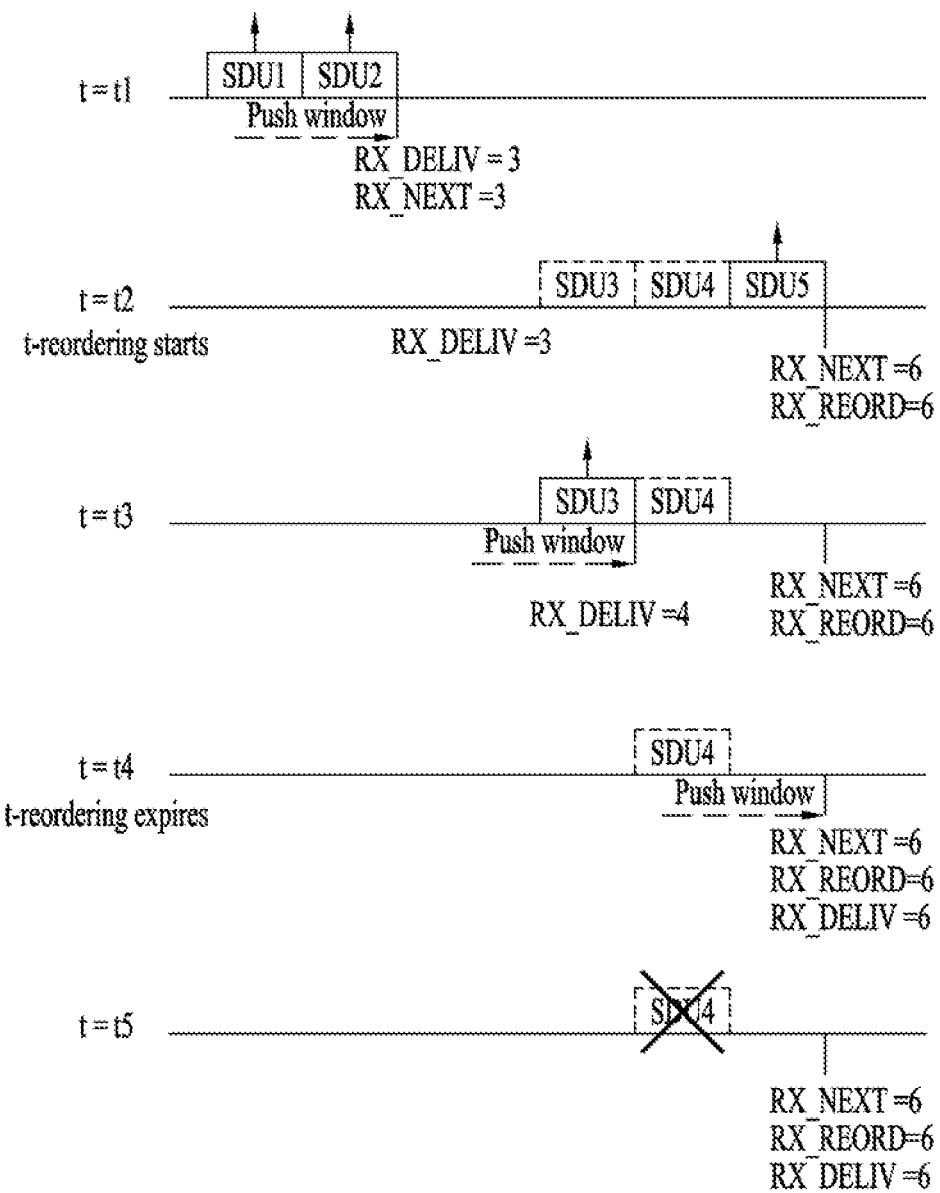
FIG. 9 is an example that a reordering function is performed when out-of-order delivery is supported according to embodiments of the present invention.

FIG. 9 is an example that a reordering function is performed when out-of-order delivery is supported according to embodiments of the present invention.

At t=t1, when SDUs 1 and 2 are received from a lower layer, the PDCP entity delivers SDUs 1 and 2 to upper layer in ascending order of the COUNT value. And RX_NEXT and RX_DELIV are updated to 3, and RX_REORD=0. In this case, RX_DELIV is lower edge of the reordering window.

At t=t2, when out-of-sequence SDU5 is received from a lower layer, the PDCP entity doesn't store and deliver it immediately. And RX_NEXT and RX REORD are updated to 6, and RX_DELIV is not updated. And a reordering timer is started for SDU3 and SDU4.

At t=t3, while the reordering timer is running, when the SDU3 is received from lower layer, the PDCP_ entity delivers the SDU3 to upper layer and RX_DELIV is updated to 4.

When the reordering timer expires at t=t4, there is no PDCP SDUs to be delivered to upper layer, but the RX_DELIV has to be updated. According to the proposed definition, the RX_DELIV is to be updated to 6 since a COUNT value of a first PDCP SDU which has not been delivered to upper layers, among PDCP SDUs with COUNT values which are equal to or larger than RX_REORD is 6.

If so, when SDU4 is received at t=t5, SDU4 can be discarded because the received COUNT value is smaller than RX_DELIV (i.e. RCVD COUNT<RX_DELIV).

When the reordering timer expires, the value of RX_DELIV is updated to 6 according to the proposed definition. The result of FIG. 9 referring to the case where out-of-order delivery is configured and the result of FIG. 7A referring to the case where out-of-order delivery is not configured are the same. That is, according to the new definition proposed by us, the same reordering procedure can be performed regardless of whether out-of-order delivery is configured or not. In conclusion, our proposed definition of RX_DELIV (i.e. a COUNT value of a first PDCP SDU which has not been delivered to upper layers, among PDCP SDUs with COUNT values which are equal to or larger than RX_REORD) is very appropriate in that it can be applied to both cases.

Figure 10A:
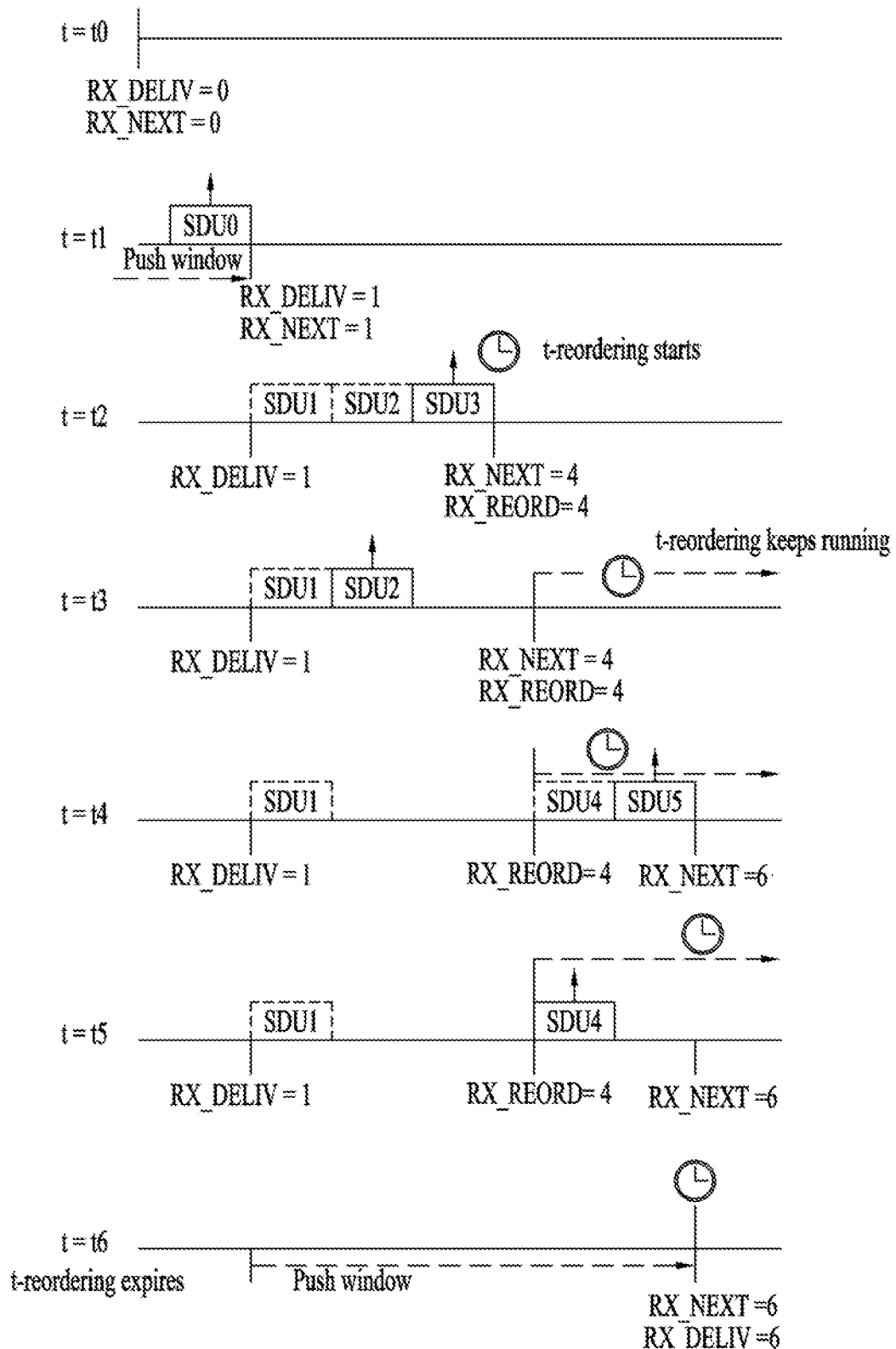
FIGS. 10A to 10C are examples for handling state variables of a PDCP entity in wireless communication system according to embodiments of the present invention.
Figure 10B:
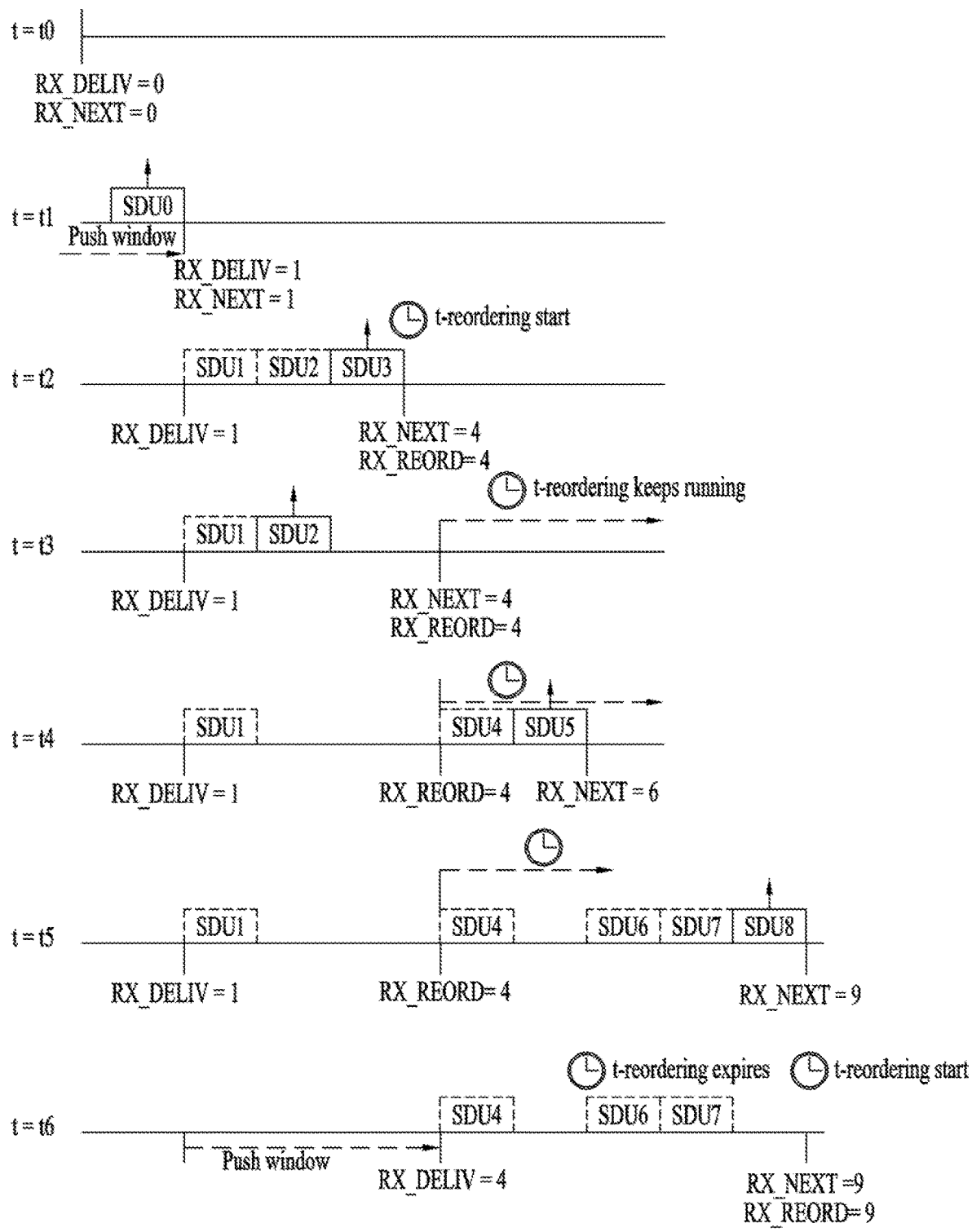
Figure 10C:
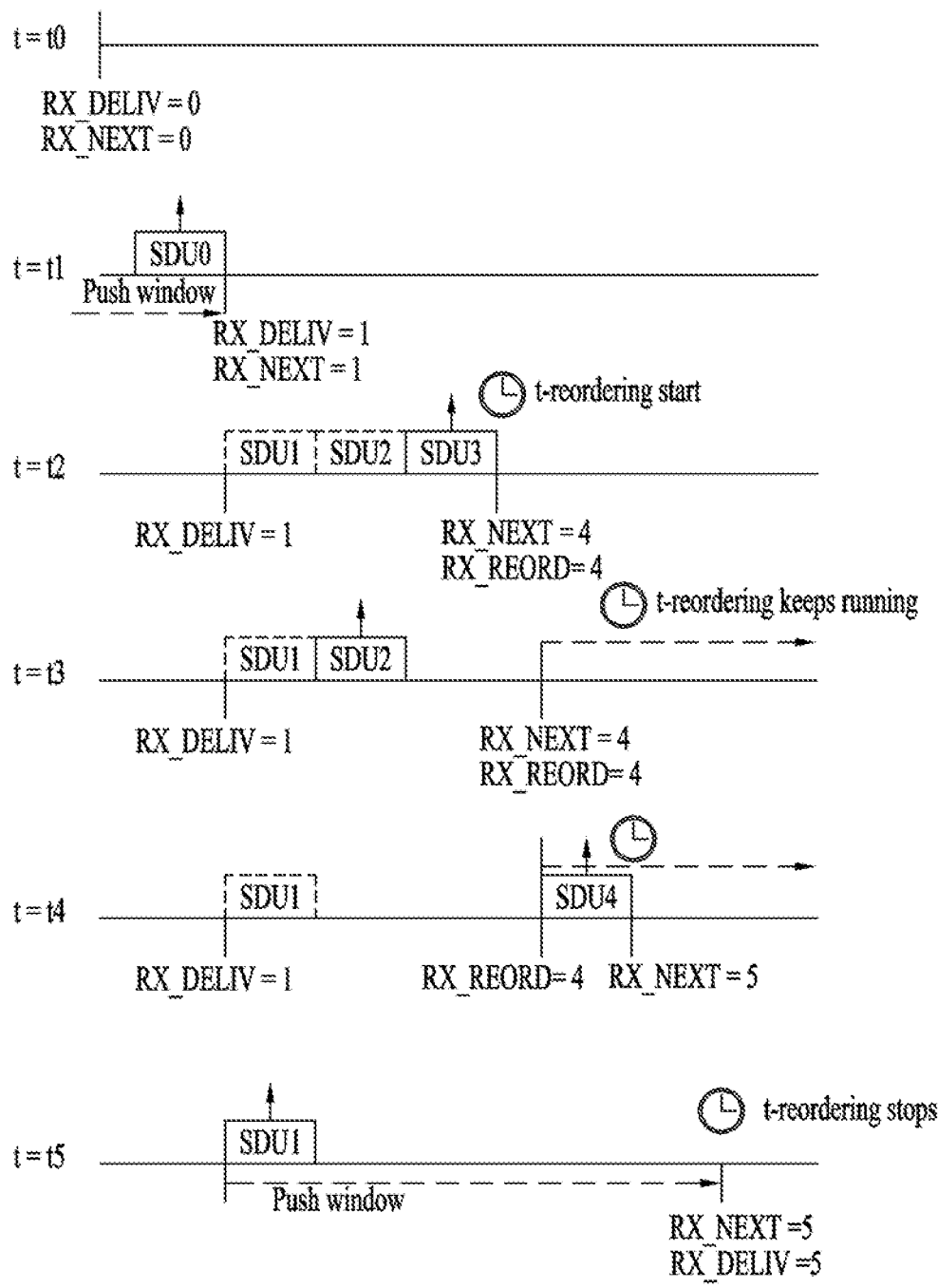

FIGS. 10A to 10C are examples for handling state variables of a PDCP entity in wireless communication system according to embodiments of the present invention.

Let's assume that the PDCP entity is configured with out-of-order delivery. When the PDCP entity is configured with out-of-order delivery, the PDCP entity delivers the out-of-order PDCP SDU to the upper layer as soon as the out-of-order PDCP SDU is received from the lower layer without storing the out-of-order PDCP SDU in a reordering buffer.

[Case A in FIG. 10A]

At t=t0, A PDCP entity is established: RX_DELIV=0, RX_NEXT=0

At t=t1, when PDCP SDU=0 is received, PDCP SDU=0 is delivered immediately to upper layer and RX_NEXT and RX_DELIV are updated to 1.

At t=t2, when PDCP SDU=3 is received, PDCP SDU=3 is delivered immediately to upper layer and RX_NEXT and RX_REORD are updated to 4 but RX_DELIV is not updated. And t-reordering starts.

At t=t3, when PDCP SDU=2 is received, PDCP SDU=2 is delivered immediately to upper layer and RX_NEXT, RX_DELIV and RX_REORD are not updated. And t-reordering keeps running.

At t=t4, when PDCP SDU=5 is received, PDCP SDU=5 is delivered immediately to upper layer and RX_NEXT is updated to 6. RX_DELIV and RX_REORD are not updated. And t-reordering keeps running.

At t=t5, when PDCP SDU=4 is received, PDCP SDU=4 is delivered immediately to upper layer and RX_NEXT, RX_DELIV and RX_REORD are not updated. And t-reordering keeps running.

At t=t6, t-Reordering expires, there is no PDCP SDU to be delivered, and RX_DELIV is updated to 6 (i.e. the COUNT value of the first PDCP_ SDU which has not been delivered to upper layers, among PDCP SDUs with COUNT value>=RX_ REORD). RX_NEXT=6 is not changed, and do not restart t-Reordering because RX_DELIV=RX_NEXT.

[Case B in FIG. 10B]

Otherwise, when PDCP SDU=8 is received instead of SDU=4 at t=t5, PDCP SDU=8 is delivered immediately to upper layer and RX_NEXT is updated to 9. And RX_DELIV=1 and RX REORD=4 are not updated. And t-reordering keeps running.

At t=t6, t-Reordering expires, there is no PDCP SDU to be delivered, and RX_DELIV is updated to 4 (i.e. the COUNT value of the first PDCP SDU which has not been delivered to upper layers, among PDCP SDUs with COUNT value>=RX_REORD). RX_NEXT=9 is not changed, and t-Reordering restarts because RX_DELIV<RX_NEXT. The RX_REORED is updated to RX_NEXT=9.

[Case C in FIG. 10C]

Meanwhile, when PDCP SDU=4 is received instead of SDU=5 at t=t4, PDCP SDU=4 is delivered immediately to upper layer and RX_NEXT is updated to 5. RX_DELIV=1 and RX_REORD=4 are not updated. And t-reordering keeps running.

At t=t5, when PDCP SDU=1 is received, PDCP SDU=1 is delivered immediately to upper layer and RX_NEXT=5 is not updated. And RX_DELIV is updated to 5 (i.e. the COUNT value of the first PDCP SDU which has not been delivered to upper layers, among PDCP SDUs with COUNT value>RX_DELIV) and t-reordering stops because RX_DELIV=RX_NEXT.

FIGS. 10A to 10C are described for out-of-order delivery, but our proposed definition can be applied regardless of whether out-of-order delivery is configured. Depending on the out-of-order delivery, the only difference is whether to deliver the out-of-order SDU immediately or later. Furthermore, if the reordering timer expires, the stored SDUs are all delivered, so the only difference is whether they are delivered in-sequence or not.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

While the above-described method has been described centering on an example applied to the 3GPP LTE and NR system, the present invention is applicable to a variety of wireless communication systems in addition to the 3GPP LTE and NR system.

What is claimed is:

1. A method performed by a receiving device operating in a wireless communication system, the method comprising:
   receiving a packet data convergence protocol (PDCP) data protocol data unit (PDU);
   in a state in which a reordering timer is not running:
      starting the reordering timer; and
      updating a first state variable following a count value associated with the PDCP data PDU which triggered the reordering timer, to a second state variable of a next PDCP service data unit (SDU) expected to be received;
   based on expiry of the reordering timer:
      updating a third state variable related to a lower edge of a reordering window, based on a lowest count value among count values of PDCP SDUs which have not been delivered to upper layers,
      wherein the lowest count value among the count values of PDCP SDUs which have not been delivered to the upper layers is equal to or greater than the first state variable following the count value associated with the PDCP data PDU which triggered the reordering timer.

2. The method according to claim 1, wherein the receiving device is configured to support delivering PDCP SDUs to the upper layers out-of-order of associated count values.

3. The method according to claim 1, wherein the first state variable is RX_REORD.

4. The method according to claim 1, wherein the second state variable is RX_NEXT.

5. The method according to claim 1, wherein the third state variable is RX_DELIV.

6. A receiving device configured to operate in a wireless communication system, the receiving device comprising:
   a transceiver;
   at least one memory; and
   at least one processor operably connectable to the at least one memory and storing instructions that, when executed by the at least one processor, perform operations comprising:

receiving a packet data convergence protocol (PDCP) data protocol data unit (PDU);

in a state in which a reordering timer is not running:
  starting the reordering timer; and
  updating a first state variable following a count value associated with the PDCP data PDU which triggered the reordering timer, to a second state variable of a next PDCP service data unit (SDU) expected to be received;

based on expiry of the reordering timer:
  updating a third state variable related to a lower edge of a reordering window, based on a lowest count value among count values of PDCP SDUs which have not been delivered to upper layers,
  wherein the lowest count value among the count values of PDCP SDUs which have not been delivered to the upper layers is equal to or greater than the first state variable following the count value associated with the PDCP data PDU which triggered the reordering timer.

7. The receiving device according to claim 6, wherein the receiving device is configured to support delivering PDCP SDUs to the upper layers out-of-order of associated count values.

8. The receiving device according to claim 6, wherein the first state variable is RX_REORD.

9. The receiving device according to claim 6, wherein the second state variable is RX_NEXT.

10. The receiving device according to claim 6, wherein the third state variable is RX_DELIV.

\* \* \* \* \*